(12) United States Patent
Takahashi

(10) Patent No.: US 8,439,093 B2
(45) Date of Patent: May 14, 2013

(54) PNEUMATIC TIRE WITH TREAD HAVING OBLONG HOLES

(75) Inventor: Toshihiko Takahashi, Osaka-fu (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 549 days.

(21) Appl. No.: 12/679,930

(22) PCT Filed: Jun. 18, 2008

(86) PCT No.: PCT/JP2008/061095
§ 371 (c)(1),
(2), (4) Date: Mar. 25, 2010

(87) PCT Pub. No.: WO2009/041131
PCT Pub. Date: Apr. 2, 2009

(65) Prior Publication Data
US 2011/0265924 A1    Nov. 3, 2011

(30) Foreign Application Priority Data

Sep. 28, 2007 (JP) .................................. 2007-253338

(51) Int. Cl.
*B60C 11/12* (2006.01)
*B60C 11/117* (2006.01)

(52) U.S. Cl.
USPC ............ 152/209.17; 152/209.18; 152/209.21; 152/DIG. 3

(58) Field of Classification Search ............. 152/209.17, 152/209.18, 209.21, DIG. 3
See application file for complete search history.

(56) References Cited

U.S. PATENT DOCUMENTS 2,006,197 A * 6/1935 Ewart et al. ................. 152/209.2
2,186,180 A * 1/1940 Sloman et al. ........... 152/DIG. 3
(Continued)

FOREIGN PATENT DOCUMENTS

DE    87 08 747        8/1987
EP       788899 A1 *  8/1997
(Continued)

OTHER PUBLICATIONS

Machine translation for Japan 10-315711 (no date).*
Machine translation for Europe 788,899 (no date).*
European Search Report for Application No. 08765712.8 dated Aug. 2, 2011 (7 pages).

*Primary Examiner* — Steven D Maki
(74) *Attorney, Agent, or Firm* — Fish & Richardson P.C.

(57) ABSTRACT

The present invention provides a pneumatic tire with reduced air columnar resonance noise level in comparison with the conventional pneumatic tires. The pneumatic tire comprises large-volume oblong holes 11 formed in a sidewall 10a on one side of a main groove 1 and small-volume oblong holes 12 formed in a sidewall 10b on the other side thereof, respectively, in which a width w1 and a depth d1 of the large-volume oblong hole 11 are at least not less than 0.4 mm and more than 0.05 times but less than 0.25 times a width W of the main groove 1, and a space p1 between the large-volume oblong holes 11 is at least not less than 0.8 mm and more than 0.2 times but less than 1.0 times the width W, a width w2 and a depth d2 of the small-volume oblong hole 12 are at least not less than 0.2 mm and more than 0.01 times but less than 0.05 times the width W, and a space p2 between the small-volume oblong holes 12 is at least not less than 0.4 mm and more than 0.04 times but less than 0.2 times the width W, and each height h of the oblong holes 11 and 12 in the depth direction of the main groove 1 is 50 to 80% of a depth D of the main groove 1.

2 Claims, 4 Drawing Sheets

U.S. PATENT DOCUMENTS

| | | | |
|---|---|---|---|
| 6,484,772 B1 | 11/2002 | De Labareyre et al. | |
| 2006/0042738 A1* | 3/2006 | Matsumoto | 152/209.21 |
| 2009/0242090 A1* | 10/2009 | Ibaraki | 152/209.3 |

FOREIGN PATENT DOCUMENTS

| | | | |
|---|---|---|---|
| JP | 03-157208 | | 7/1991 |
| JP | 08-058317 | | 3/1996 |
| JP | 10-315711 | | 12/1998 |
| JP | 10-315711 A | * | 12/1998 |
| JP | 2001-511733 | | 8/2001 |
| JP | 2003-312212 | | 11/2003 |
| JP | 2006-69305 | | 3/2006 |

* cited by examiner

PNEUMATIC TIRE WITH TREAD HAVING OBLONG HOLES

TECHNICAL FIELD

The present invention relates to a pneumatic tire with reduced air columnar resonance noise level.

This application claims benefit of priority based on Japanese Patent Application No. 2007-253338 filed on Sep. 28, 2007, the entire same contents of which are incorporated by reference herein.

BACKGROUND ART

In a state where a tire contacts the ground, tubular space is formed by a main groove extending in the tire circumferential direction and road surface. The rotation of tires lets air compressed in the tubular space to release outside, resulting in generating air columnar resonance noise. Since the air columnar resonance noise is offensive noise whose frequency is around 1 kHz, reduction in air columnar resonance noise has been demanded conventionally. For example, the pneumatic tire disclosed in the patent document 1 includes a great number of oblong holes extending in the depth direction of a main groove formed in a sidewall of the main groove. With the oblong holes, frictional resistance against the air flow in the main groove increases and as a result, air columnar resonance noise is reduced.

patent document 1: Unexamined Japanese Laid-Open Patent Publication No. 10-315711(FIG. 1)

DISCLOSURE OF THE INVENTION

Problem to be Solved by the Invention

In the pneumatic tire of the patent document 1, air columnar resonance noise level had not been able to be reduced sufficiently because the degree of decrease or non-uniform of particle velocity of the air flow in a main groove is insufficient. Therefore, the object of the present invention is to provide a pneumatic tire with reduced air columnar resonance noise level compared to the conventional tires.

The pneumatic tire of the present invention has main grooves extending in the tire circumferential direction formed on a tread, wherein a plurality of oblong holes extending in the depth direction of the main groove are provided in sidewalls on both sides of the main groove, the large-volume oblong holes are formed on one sidewall and the small-volume oblong holes are formed on the other sidewall, respectively, a width w1 and a depth d1 of the large-volume oblong holes are at least not less than 0.4 mm, and more than 0.05 times but less than 0.25 times a width W of the main groove, and a space p1 between the large-volume oblong holes is at least not less than 0.8 mm and more than 0.2 times but less than 1.0 times the width W of the main groove, a width w2 and a depth d2 of the small-volume oblong holes are at least not less than 0.2 mm, and more than 0.01 times but less than 0.05 times the width W of the main groove, and a space p2 between the small-volume oblong holes is at least not less than 0.4 mm, and more than 0.04 times but less than 0.2 times the width W of the main groove, and each height h of the large-volume oblong holes and the small-volume oblong holes in the depth direction of the main groove is 50 to 80% of a depth D of the main groove.

Similar to the conventional tires, frictional resistance against the air flow in the main groove is increased by forming a plurality of oblong holes extending in the depth direction of the main groove. Since cross-sectional areas of the large-volume oblong holes and the small-volume oblong holes in the width direction of the main groove are different, the degree of variation of a cross-sectional area including the main groove and the oblong holes in the width direction of the main groove becomes larger. As a result, particle velocity of the air flow in the main groove becomes non-uniform, thereby enabling to reduce air columnar resonance noise more effectively.

Additionally, in a main groove sandwiched by a rib and a block row, the large-volume oblong holes are formed in the sidewall on the block row side and the small-volume oblong holes are formed in the sidewall on the rib side, respectively. Therefore, pattern rigidity is made uniform and steering stability is also improved.

BRIEF DESCRIPTION OF THE DRAWINGS

FIG. 2 (*b*) is a view showing small-volume oblong holes.

Figure 1:
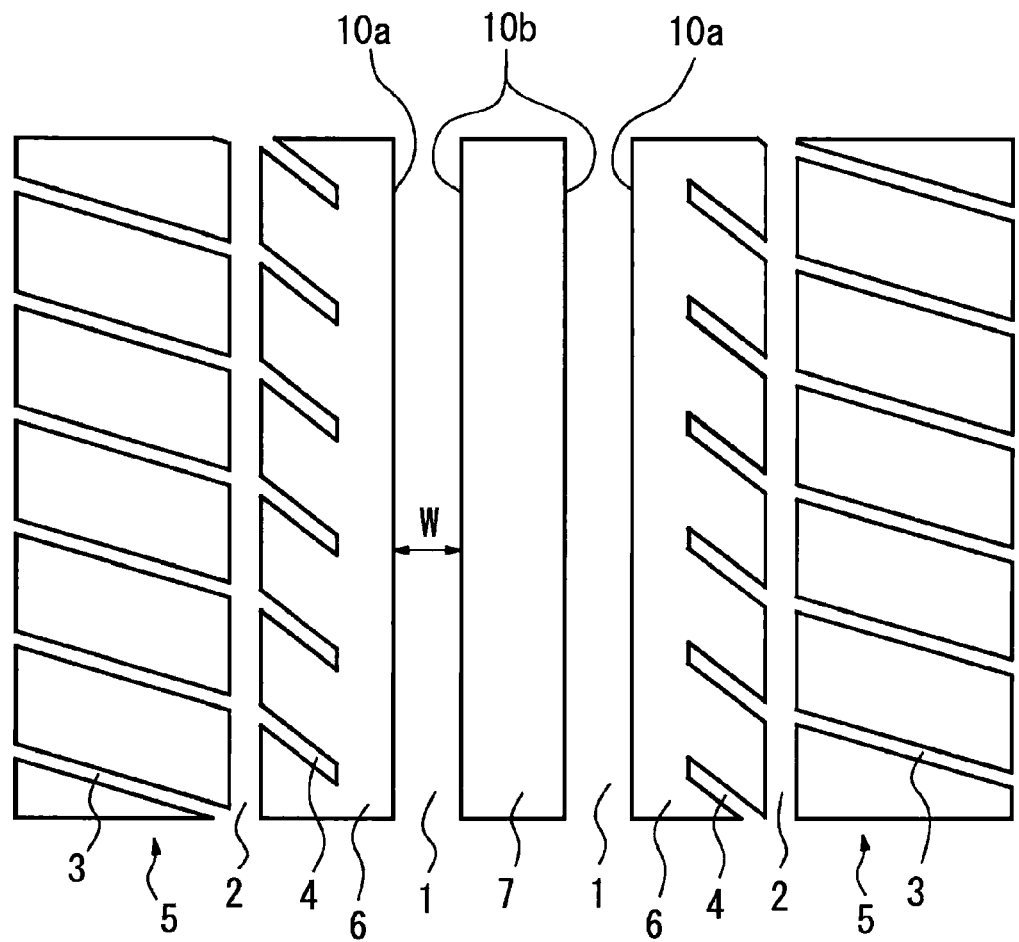
FIG. 1 is a view showing a tread pattern of the pneumatic tire related to the present invention.

| DESCRIPTION OF THE REFERENCE NUMERALS | |
|---|---|
| 1, 2 | main groove |
| 3 | transverse groove |
| 4 | lug groove |
| 5, 8, 9 | block row |
| 6, 7 | rib |
| 10a, 10b | sidewall of main groove |
| 11 | large-volume oblong hole |
| 12 | small-volume oblong hole |

BEST MODE FOR CARRYING OUT THE INVENTION

Hereinafter, the embodiments for carrying out the pneumatic tire of the present invention are described with referent to drawings. FIG. 1 is a view showing a tread pattern of the pneumatic tire related to the present invention. In a tread, there are formed main grooves 1 and 2 extending in the tire circumferential direction and additionally, transverse grooves 3 and lug grooves 4 are formed. Block rows 5 are formed on both ends in the tire width direction and ribs 6 provided with the lug grooves are formed further inside thereof, respectively. At the center of the pneumatic tire in the width direction, a rib 7 is formed by the main grooves 1.

Figure 2A:
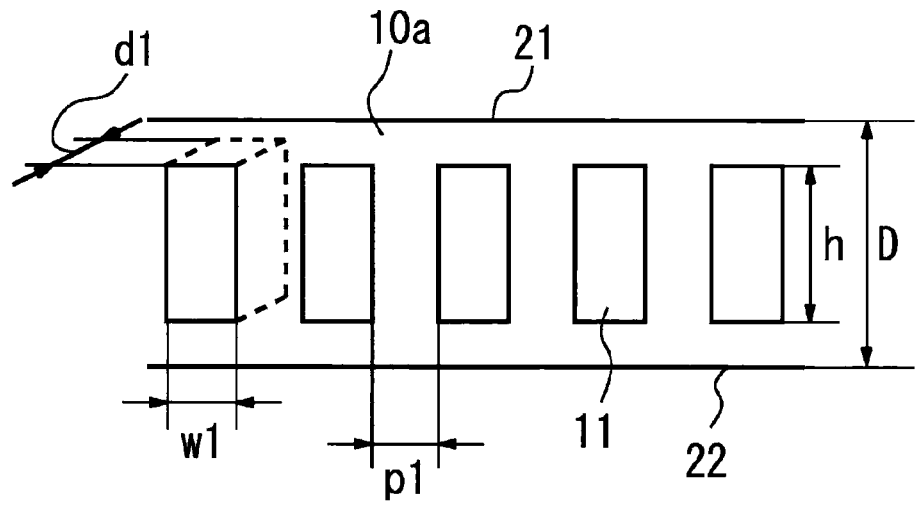
FIG. 2 (*a*) is a view showing large-volume oblong holes.
Figure 2B:
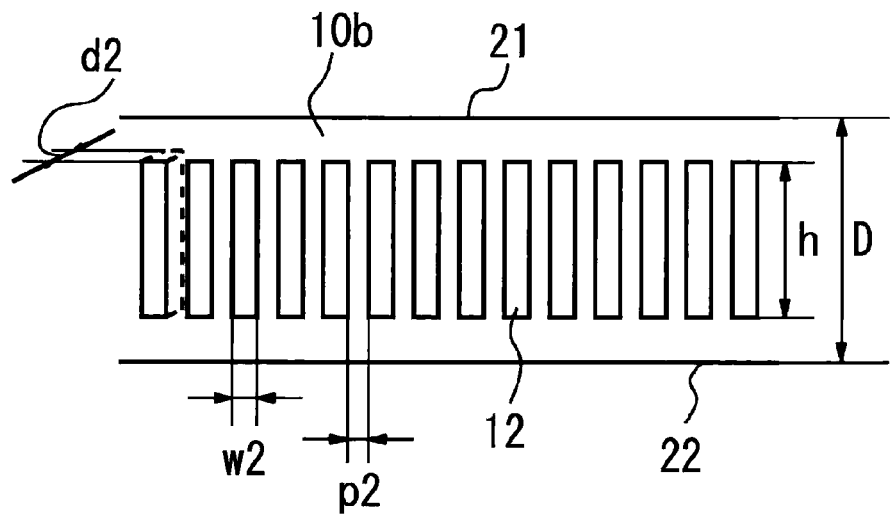

FIGS. 2(*a*) and (*b*) show sidewalls 10*a* and 10*b* of the main groove 1, respectively. On one sidewall 10*a*, a plurality of large-volume oblong holes 11 are arranged in the tire circumferential direction at intervals. On the other sidewall 10*b*, small-volume oblong holes 12 are arranged in the tire circumferential direction at intervals. Oblong holes 11 and 12 extend in the direction from a tread surface 21 toward a groove bottom 22 (in the direction perpendicular to the tread surface).

By the oblong holes 11 and 12, the frictional resistance against the air flow in the main groove 1 is increased, resulting in reduction of air columnar resonance noise. Furthermore, since the oblong holes 11 and 12 having different volumes are provided in the sidewalls 10a and 10b of the main groove, respectively, the degree of variation of a cross-sectional area including the main groove 1 and the oblong holes 11 and 12 in the width direction of the main groove becomes larger. Consequently, the particle velocity of the air flow in the main groove 1 becomes non-uniform, thereby enabling to reduce air columnar resonance noise more effectively. Therefore, it is preferable that the ratio of the volume of the large-volume oblong hole 11 (width w1×height h×depth d1) to the volume of the small-volume oblong hole 12 (width w2×height h×depth d2) is set at not less than 4.0. When the volume ratio exceeds 8.0, the pattern rigidity becomes non-uniform, which is easily likely to cause a problem of degrading the steering stability or uneven wear.

It is preferable that the width w1 and the depth d1 of the large-volume oblong hole 11 are set to at least not less than 0.4 mm, and more than 0.05 times but less than 0.25 times a width W of the main groove 1, and a space p1 between the large-volume oblong holes 11 is set to at least not less than 0.8 mm, and more than 0.2 times but less than 1.0 times the width W of the main groove 1. It is preferable that the width w2 and the depth d2 of the small-volume oblong hole 12 are set to at least not less than 0.2 mm, and more than 0.01 times but less than 0.05 times the width W of the main groove 1, and a space p2 between the small-volume oblong holes 12 is set to at least not less than 0.4 mm, and more than 0.04 times but less than 0.2 times the width W of the main groove 1. Furthermore, each height h of the large-volume oblong hole 11 and the small-volume oblong hole 12 in the depth direction of the main groove is 50 to 80% of the depth D of the main groove 1.

When the width w1 or the depth d1 of the large-volume oblong hole 11 is large out of these ranges or the height h of the oblong hole 11 and the height h of the oblong hole 12 are high out of these ranges, the rigidity of the ribs 6 and 7 on both sides of the main groove 1 is so lowered that the steering stability may be degraded or uneven wear may occur. On the other hand, when the width w2 or the depth d2 of the small-volume oblong hole 12 is smaller or the height h of the oblong holes 11 and the height h of the oblong holes 12 are lower, the efficacy of reducing air columnar resonance noise is lessened.

Conversely, even if a plurality of the small-volume oblong holes 12 are arranged in the sidewall 10a and a plurality of the large-volume oblong holes 11 are arranged in the sidewall 10b, respectively, the same effect can be obtained. Furthermore, the large-volume oblong holes 11 and the small-volume oblong holes 12 can be applied for the tire provided with block rows.

Figure 3:
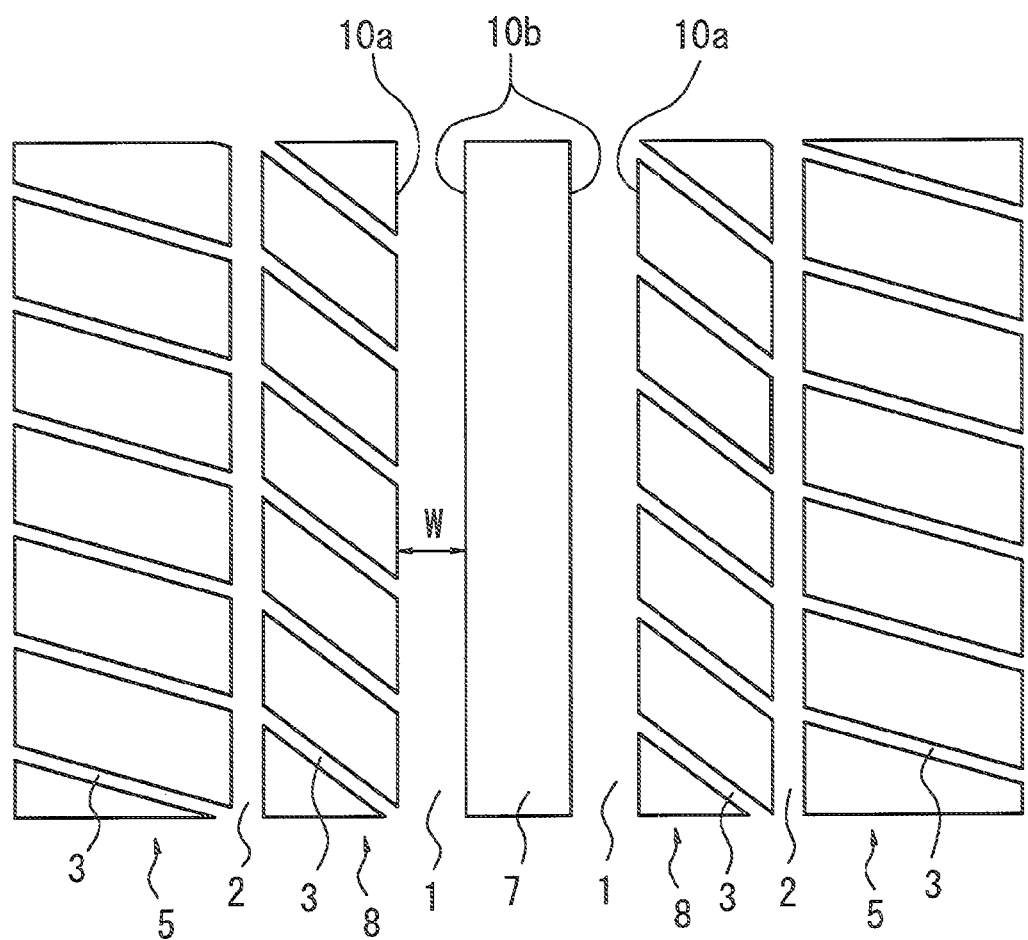
FIG. 3 is a view showing a tread pattern of the pneumatic tire related to the present invention.

For example, as shown in FIG. 3, in a tire provided with block rows 8 on both sides of the rib 7 at the center of the width direction, a plurality of the large-volume oblong holes 11 on one sidewall 10a of the main groove 1 and a plurality of the small-volume oblong holes 12 on the other sidewall 10b of the main groove 1 may be arranged in the tire circumferential direction at intervals, respectively and vice versa.

In particular, in the main groove 1 sandwiched by the rib 7 and the block row 8, the pattern rigidity is made uniform by forming large-volume oblong holes 11 in the sidewall 10a on the side of the block row 8 and the small-volume oblong holes 12 are in the sidewall 10b on the side of the rib 7, respectively, thereby improving steering stability.

Figure 4:
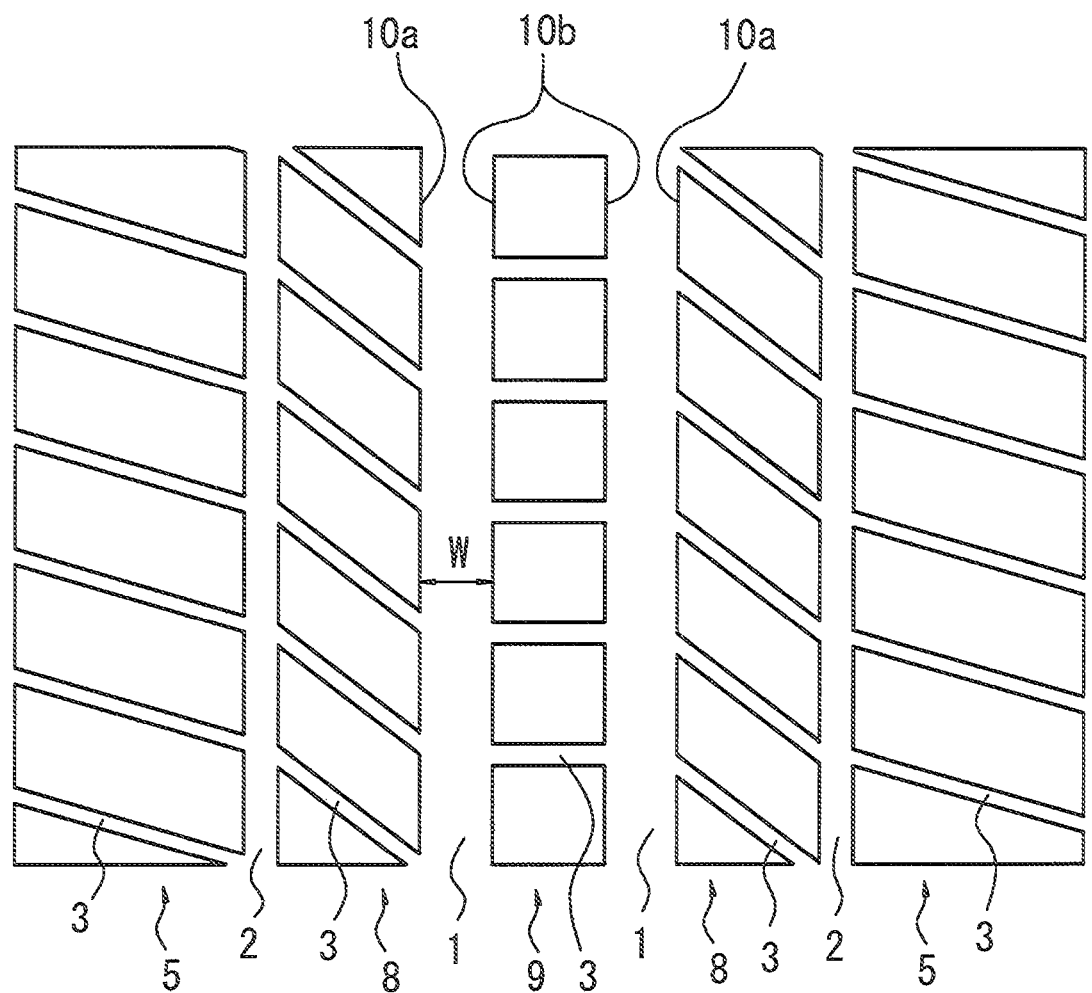
FIG. 4 is a view showing a tread pattern of the pneumatic tire related to the present invention.

In the alternative, as shown in FIG. 4, the large-volume oblong holes 11 and the small-volume oblong holes 12 may be provided in the sidewall of the main groove 1 sandwiched by the block rows 8 and 9. In this case, a plurality of the large-volume oblong holes 11 in the sidewall 10a on one side of the main groove 1 and a plurality of the small-volume oblong holes 12 in the sidewall 10b on the other side of the main groove 1 may be arranged in the tire circumferential direction at intervals, respectively and vice versa.

The oblong holes 11 and 12 may be extended in the normal direction of the tread surface or by inclining in any directions at the angle within 45 degrees with respect to the normal line of the tread surface. When they are inclined beyond 45 degrees, the effect of reducing air columnar resonance noise becomes smaller.

Example

Tires of Examples and Comparative examples according to the present invention were manufactured and evaluation was made on the tires, respectively. The tires of Comparative examples include either the large-volume oblong holes 11 or the small-volume oblong holes 12. With a tire having a tread pattern as illustrated in FIG. 1 and a tire size of 225/45R17 that is mounted on a rim whose size is 17×7.5 jj, steering stability and noise level thereof were evaluated at air pressure of 220 kPa.

Tables 1 to 3 show results evaluated on tires having such patterns as shown in FIG. 1, FIG. 3 and FIG. 4, respectively. The steering stability is the values obtained from sensory evaluation on tires mounted on a car of 2500 cc displacement when driven by two drivers on a dry road and a wet road. In each table, results are denoted in indices with the values obtained in Comparative examples 1, 3 and 5 set as 100 and as the number is larger, it indicates better steering stability. The noise level is the values obtained by measuring air columnar resonance noise level at ⅓ octave-band 1 kHz by an engine bench test according to JASO-C606 (at the velocity of 50 km/h) and by calculating with the values obtained in Comparative examples 1, 3 and 5 set as 0 dB in each table.

TABLE 1

|  |  | Example 1 | Example 2 | Comparative Example 1 | Comparative Example 2 |
|---|---|---|---|---|---|
| Dimension of large volume oblong holes (mm) | Width w1 | 2.0 | 2.0 | — | 2.0 |
|  | Depth d1 | 1.0 | 1.0 | — | 1.0 |
|  | Space p1 | 10.0 | 10.0 | — | 10.0 |
|  | Height h | 5.5 | 5.5 | — | 5.5 |
|  | Sidewall location | 10a | 10b | — | 10a, 10b |
| Dimension of small volume oblong holes (mm) | Width w2 | 0.5 | 0.5 | 0.5 | — |
|  | Depth d2 | 0.5 | 0.5 | 0.5 | — |
|  | Space p2 | 1.0 | 1.0 | 1.0 | — |
|  | Height h | 5.5 | 5.5 | 5.5 | — |
|  | Sidewall location | 10a | 10b | 10a, 10b | — |

TABLE 1-continued

|  | Example 1 | Example 2 | Comparative Example 1 | Comparative Example 2 |
|---|---|---|---|---|
| Steering stability | 102 | 102 | 100 | 104 |
| Noise level (dB) | −2.3 | −2.3 | — | +0.5 |

Depth of main groove D: 8.0 mm
Width of main groove W: 10.0 mm

TABLE 2

|  |  | Example 3 | Example 4 | Comparative Example 3 | Comparative Example 4 |
|---|---|---|---|---|---|
| Dimension of large volume oblong holes (mm) | Width w1 | 2.0 | 2.0 | — | 2.0 |
|  | Depth d1 | 1.0 | 1.0 | — | 1.0 |
|  | Space p1 | 10.0 | 10.0 | — | 10.0 |
|  | Height h | 5.5 | 5.5 | — | 5.5 |
|  | Sidewall location | 10a | 10b | — | 10a, 10b |
| Dimension of small volume oblong holes (mm) | Width w2 | 0.5 | 0.5 | 0.5 | — |
|  | Depth d2 | 0.5 | 0.5 | 0.5 | — |
|  | Space p2 | 1.0 | 1.0 | 1.0 | — |
|  | Height h | 5.5 | 5.5 | 5.5 | — |
|  | Sidewall location | 10b | 10a | 10a, 10b | — |
| Steering stability |  | 103 | 101 | 100 | 104 |
| Noise level (dB) |  | −2.0 | −2.0 | — | +0.5 |

Depth of main groove D: 8.0 mm
Width of main groove W: 10.0 mm

TABLE 3

|  |  | Example 5 | Example 6 | Comparative Example 5 | Comparative Example 6 |
|---|---|---|---|---|---|
| Dimension of large volume oblong holes (mm) | Width w1 | 2.0 | 2.0 | — | 2.0 |
|  | Depth d1 | 1.0 | 1.0 | — | 1.0 |
|  | Space p1 | 10.0 | 10.0 | — | 10.0 |
|  | Height h | 5.5 | 5.5 | — | 5.5 |
|  | Sidewall location | 10a | 10b | — | 10a, 10b |
| Dimension of small volume oblong holes (mm) | Width w2 | 0.5 | 0.5 | 0.5 | — |
|  | Depth d2 | 0.5 | 0.5 | 0.5 | — |
|  | Space p2 | 1.0 | 1.0 | 1.0 | — |
|  | Height h | 5.5 | 5.5 | 5.5 | — |
|  | Sidewall location | 10a | 10b | 10a, 10b | — |
| Steering stability |  | 102 | 102 | 100 | 104 |
| Noise level (dB) |  | −1.3 | −1.3 | — | +0.5 |

Depth of main groove D: 8.0 mm
Width of main groove W: 10.0 mm

According to Tables 1 to 3, each tire of Examples allowed to reduce air columnar resonance noise level and improve steering stability. In Comparative examples, air columnar resonance noise level could not be reduced.

What is claimed is:

1. A pneumatic tire with main grooves extending in the tire circumferential direction formed on a tread,
    wherein a plurality of oblong holes extending in the depth direction of each main groove are provided entirely within sidewalls on both sides of each main groove, only large-volume oblong holes are formed in one sidewall and are uniformly arranged and only small-volume oblong holes are formed in the other sidewall and are uniformly arranged, respectively,
    a width w1 and a depth d1 of the large-volume oblong hole are at least not less than 0.4 mm and more than 0.05 times but less than 0.25 times a width W of the main groove, a space p1 between the large-volume oblong holes is at least not less than 0.8 mm and more than 0.2 times but less than 1.0 times the width W of the main groove,
    a width w2 and a depth d2 of the small-volume oblong hole are at least not less than 0.2 mm and more than 0.01 times but less than 0.05 times the width W of the main groove, and a space p2 between the small-volume oblong holes is at least not less than 0.4 mm and more than 0.04 times but less than 0.2 times the width W of the main groove, and
    each height h of the large-volume oblong holes and the small-volume oblong holes in the depth direction of the main groove is 50 to 80% of a depth D of the main groove.

2. The pneumatic tire as set forth in claim 1, wherein a main groove sandwiched by a rib and a block row includes the large-volume oblong holes formed in the sidewall on the block row side and the small-volume oblong holes formed in the sidewall on the rib side, respectively.

* * * * *